May 26, 1936.  A. G. LEAKE  2,042,179
SEAT CONNECTION
Filed March 6, 1933   2 Sheets-Sheet 1
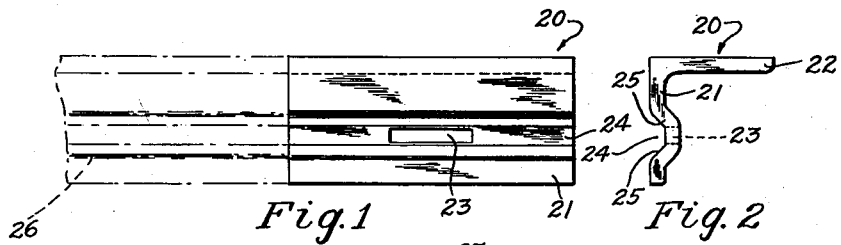
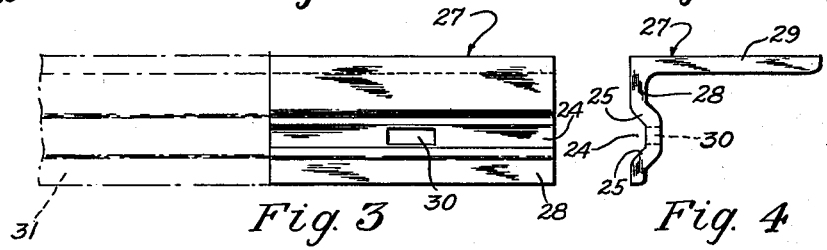
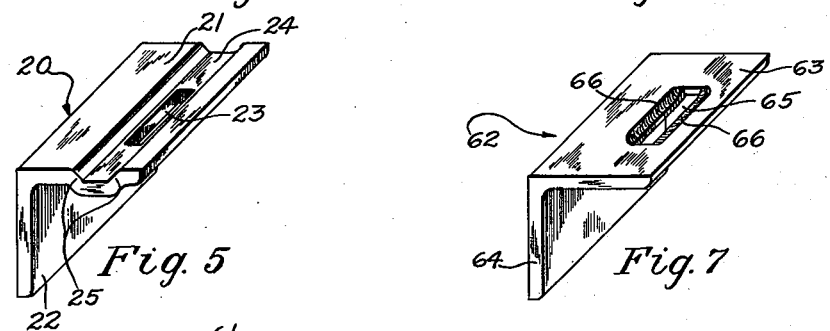
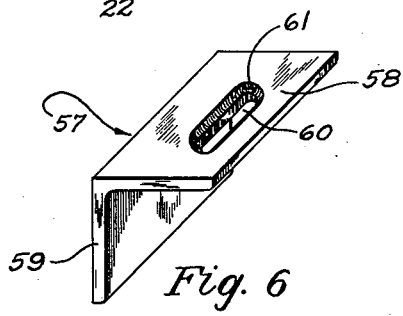
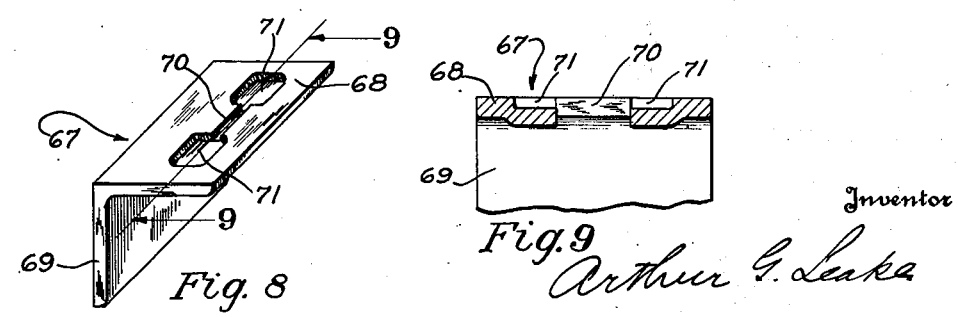
Inventor
Arthur G. Leake
By Wooster & Davis
Attorneys May 26, 1936.　　　A. G. LEAKE　　　2,042,179
SEAT CONNECTION
Filed March 6, 1933　　　2 Sheets-Sheet 2
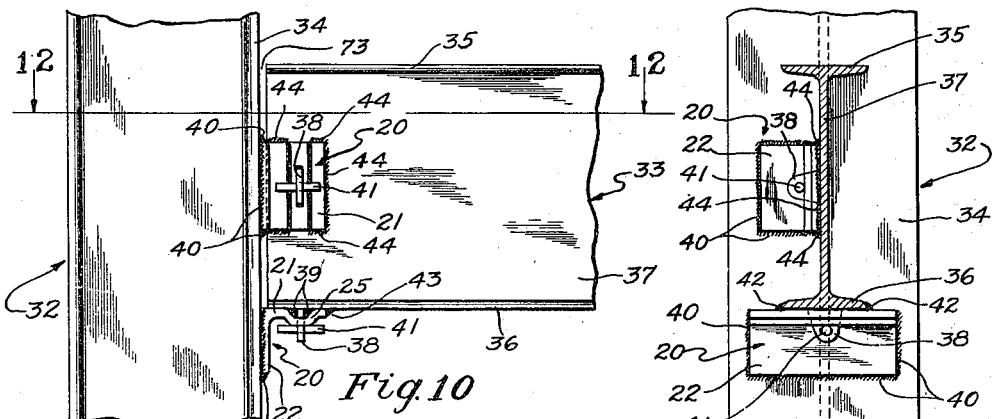
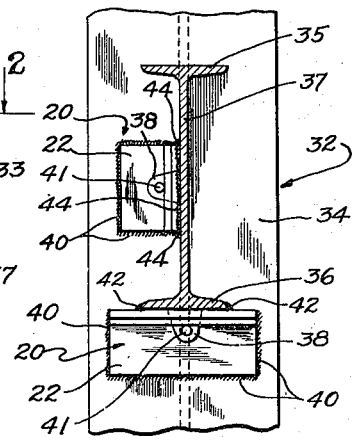
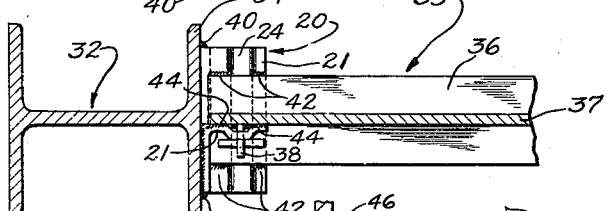
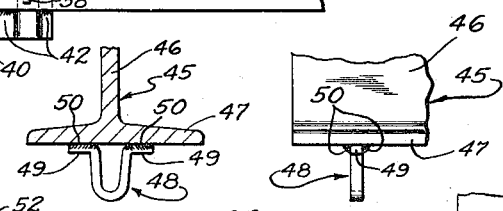
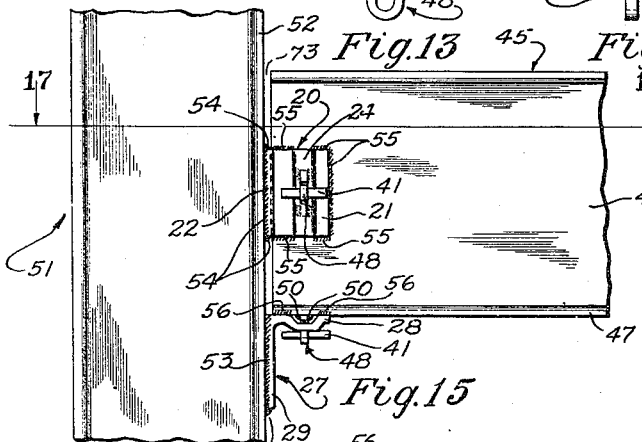
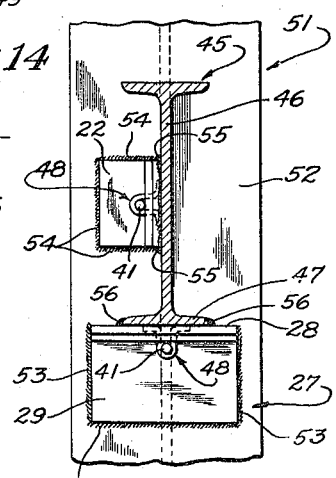
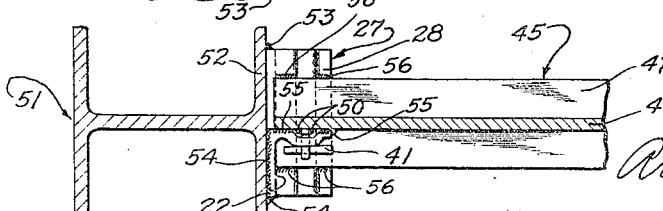

Patented May 26, 1936

2,042,179

UNITED STATES PATENT OFFICE 2,042,179

SEAT CONNECTION

Arthur G. Leake, Bridgeport, Conn.

Application March 6, 1933, Serial No. 659,788

8 Claims. (Cl. 189—36)

This invention relates to new and useful improvements in boltless structural steel connections for welded steel structures.

An object of the invention is to provide a seat or angle connection or bracket of improved construction for use in connecting beams with columns, the said connection being adapted for welding to a column and designed to receive a lug or means welded to a beam and to cooperate therewith for securing the beam to the column.

Other objects and advantages will become apparent from a consideration of the following detailed description taken in connection with the accompanying drawings wherein satisfactory embodiments of the invention are shown. However, it will be understood that the invention is not limited to the details disclosed but includes all such variations and modifications as fall within the spirit of the invention and the scope of the appended claims.

In the drawings:

Fig. 1 is a plan view of a bracket or connecting seat member constructed according to the present invention;

Fig. 2 is an end elevational view of the bracket of Fig. 1;

Fig. 3 is a view similar to Fig. 1, but showing a slightly different bracket;

Fig. 4 is an end elevational view of the bracket of Fig. 3;

Fig. 5 is a perspective view of the bracket of Fig. 1;

Fig. 6 is a perspective view of a slightly different construction of bracket;

Fig. 7 is a perspective view of a further modified form;

Fig. 8 is a perspective view showing yet another modification;

Fig. 9 is a sectional view taken substantially along the line 9—9 of Fig. 8;

Fig. 10 is a side elevational view showing the device of Figs. 1 and 2 in use;

Fig. 11 is a view looking from the right in Fig. 10;

Fig. 12 is a sectional view taken substantially along the line 12—12 of Fig. 10;

Fig. 13 is a detail view showing a different form of lug member on a beam;

Fig. 14 is a view taken at right angles to Fig. 13;

Fig. 15 is a view similar to Fig. 10 but showing the bracket of Figs. 1 through 5 as used with the lug member of Figs. 13 and 14;

Fig. 16 is a view looking from the right in Fig. 15; and

Fig. 17 is a sectional view taken substantially along the line 17—17 of Fig. 15.

Referring in detail to the drawings, and at first to Figs. 1, 2 and 5 thereof, the improved seat member or bracket is generally designated 20 and is substantially in the form of a length of angle iron including arms or flanges 21 and 22 arranged substantially at right angles to one another. Flange or arm 21 is provided with an elongated opening 23 and this opening is arranged intermediate the ends of and in the bottom wall of a groove 24 extending for the length of the arm 21 and having inclined side walls 25. The purpose of this structure will later more fully appear but here it will be noted that the member 20 may be formed by cutting the desired length from a bar rolled into the proper shape at the mill, a continuation of the bar being suggested by the broken lines 26.

Referring now to Figs. 3 and 4, the seat member or bracket is generally designated 27 and includes arms or flanges 28 and 29, the former of which includes or is provided with the groove 24 having in its bottom wall intermediate its ends an opening or slot 30. This member 27 may also be cut of the desired length and from a properly rolled bar suggested by the broken lines 31. Bracket 27 is of substantially the same construction as the bracket 20, the material differences being that the flange or arm 29 of bracket 27 is of greater length than the corresponding arm 22 of the bracket 20 and the opening 30 of bracket 27 is of less length than the opening 23 of the bracket 20.

Figs. 10, 11 and 12 illustrate the manner in which the bracket or connecting seat member of Figs. 1 and 2 may be employed. In Figs. 10 11 and 12 a column, in the form of an I-beam, is generally indicated at 32 while a cross beam or girder is generally indicated at 33, the column including a flange 34 while the cross beam includes an upper flange 35 a lower flange 36 and a web portion 37. When the beam 33 is to be connected with the column 34 a lug 38 is welded to the under side of the flange 36 of the beam as at 39. Also, one of the brackets or seat members 20 may be welded at the proper place onto the flange 34 of column 32, the flange 22 of the said bracket being welded about its edges as at 40 and the flange or arm 21 thereof being disposed horizontally.

The beam 33 may now be swung into position to dispose its end portion on the arm 21 of the bracket or seat angle 20 and to have its lug 38 pass through the opening 23 in said arm of the bracket. In this connection, it will be noted that the lug 38 may have a snug fit in the opening 23 and it will further be noted that the welding material 39 forming the connection between the lug and the lower flange 36 of the beam is received in the groove 24 whereby the beam rests flat on the surface of the horizontally disposed arm of the bracket. Next, a pin 41 may be driven through the lug at the lower side of the horizontal bracket arm whereby to prevent movement of the lug out of the opening 23.

If desired, the flange 36 of the beam may then be welded to the horizontal arm 21 of the bracket at each side of the groove 24 of said arm as at 42 and the beam and column will then be securely connected. Should there be danger of the pin 41 working loose and falling and causing damage it may be welded in place or it may be removed after the beam has been welded to the bracket, an additional point of weld between the beam and bracket being indicated at 43. Since the lug 38 fits snugly in the opening 23 and since the welding material 39 connecting the lug with the beam is received in the groove 24 between the inclined walls 25 thereof it will be appreciated that there will be no relative movement between the beam and column as has heretofore been experienced due to the fact that the openings in the brackets or seat members have been made larger than the lugs whereby the welding material connecting the lugs with the beams would be accommodated.

At the same time that a bracket 20 is welded to the column with the arm 21 of said bracket disposed horizontally another of said brackets may be welded to the column with its arm 21 disposed vertically. The arm 22 of this second bracket is welded about its edges at 40 whereby the bracket is securely attached to the column. At the proper point on the web 37 of the beam a lug 38 is welded in place to extend horizontally from the beam and when the beam is swung into position it is given a downward and lateral movement so that its lugs 38 pass through the openings 23 in the respective brackets. With this arrangement the pins 41 would, of course, be driven home and the bracket having its arm 21 disposed vertically would be welded to the web 37 of the beam as at 44, after which its pin 41 could be welded in place or removed as desired. This bracket 20 and lug 38 provide a means for positioning and securing the beam 33 in the proper vertical position, that is, the beam is automatically plumbed.

Figs. 13 and 14 disclose a beam 45 including a web portion 46 and a lower flange 47 to which lower flange is welded a modified form of lug 48 the same being somewhat in the shape of a V having the free end of its arms out-turned as at 49 and welded to the under surface of the bottom flange 47 of the beam as at 50. These lugs 48 may be bent up from lengths of stock of the desired cross sectional configuration.

Figs. 15, 16 and 17 show the manner in which the lug 48 may be used in connection with a bracket 20 and a bracket 27. In these figures the beam 45 is shown connected with a column generally designated 51 and including a flange 52. In carrying out the invention a bracket 27 is welded to the flange 52 of the column at the proper height and with the flange 28 of the bracket extending horizontally the weld being about the edges of the flange 29 as at 53. Either before or after this work has been accomplished a bracket 20 is welded to the column at a point above the bracket 27 and bracket 20 is so arranged that its arm 21 lies vertically, its arm 22 being welded to the column as at 54.

One of the lugs 48 is also welded to the web 46 of the beam 45 and extends horizontally therefrom and when the beam is swung into position one of its lugs is passed through the opening 30 in the bracket 27 while its other lug is passed through the opening 23 in bracket 20. The pins 41 are then driven home to secure the parts in place and the arm 21 of bracket 20 may be welded to the web as at 55 while the horizontal arm 28 of the bracket 27 may be welded to the beam flange 47 as at 56. After this work has been completed the pins 41 may be either welded in place or removed. It will be understood that the lugs 48 fit snugly in the openings in the brackets, and that the out-turned end portions 49 of said lug together with the material 50 welding them to the beam is received in the grooves 24 of the respective brackets whereby the flange 47 and web 46 of the beam may set snugly against the arms 28 and 21 of the respective brackets.

With this construction it is not necessary to cut the beams 33 or 46 accurately to length as the lugs 38 and similar lugs may be located a distance from the end of the beam to leave a space 73. The beams as cut by the mill vary in length between certain limits and if the end of the beam had to be in contact with the column it would be necessary in a number of instances to cut off a short length of the beam, but with the present construction and arrangement this is not necessary as the variations can be calculated for, so no cutting of the beams is required.

Referring now to Fig. 6, the bracket of this figure is generally designated 57 and is designed as a substitute or alternate for the brackets of Figs. 1 through 5. Bracket 57 is also an angle member and includes arms or flanges 58 and 59 corresponding with the arms 21 and 22 of brackets 20. Arm 58 of bracket 57 has an opening 60 therethrough to receive a lug as will be understood and about said opening the material of the bracket is pressed or cut away to provide a cup or counter-sink 61 adapted to receive the welding material 39 securing a lug 38 to a beam. The size and shape of this counter-sink or cup depends, of course, on circumstances. However, in Fig. 6 it is shown as extending entirely around the upper edge of the hole or opening 60.

Referring to the modification of Fig. 7 the bracket is generally designated 62 and includes arms 63 and 64 the former of which has an opening 65 cupped or counter-sunk along its longitudinal edges as at 66. It will be understood that this opening 65 is to receive a lug welded to a beam and that the opening snugly receives said lug and that the welding material for the lug is accommodated in the counter-sinks 66.

Figs. 8 and 9 show a slightly different construction and in these figures the bracket is generally designated 67 and includes arms 68 and 69 the former of which is provided with an opening or slot 70 to snugly receive a lug welded to a beam. At opposite ends of the opening or slot 70 the arm 68 is provided with depressions 71 communicating with the ends of the slot and designed to receive the welded portions of a lug. With this arrangement it will be apparent that the lug may snugly fit within the opening 70 whereby a beam to which the lug is welded and a column to which the bracket is welded may be held against relative movement, the welded portion of the lug being accommodated in the depressions 71.

From the foregoing description taken in connection with the drawings it will be apparent that according to the present invention a column and a beam may be prepared and the beam then swung into proper position relative to the column and the beam and column quickly connected against relative movement and that while the parts are so held they may be permanently connected by welding operations. If the lugs and brackets are properly placed all the members of the structure are automatically plumbed and accurately positioned as they are secured in position. In the various forms of brackets disclosed provision is made to accommodate the enlargements represented by the welding material used for connecting the lugs to the beam. It will further be apparent that various forms of lugs may be employed.

Having thus set forth the nature of my invention, what I claim is:

1. In combination, a column, a beam at right angles to said column, means anchoring one end portion of the beam to the column, said means including a bracket comprising two connected arms arranged with their outer surfaces in right angular relationship, means securing one of said arms to the column with the other arm of the bracket extending outwardly in the direction of the beam end, said other arm of the bracket having a non-circular opening therethrough, a non-circular lug secured against a surface of the beam by the deposit of weld metal about the edges of one end of the lug and said lug extending outwardly of the beam, said lug extending through the opening in the bracket arm and having a snug fit therein, and said bracket arm having a recess in its outer surface toward the beam and about said opening and receiving the deposited weld metal about the edges of the lug whereby said surface of the beam about the lug lies flat against the outer surface of the bracket arm.

2. In combination, a column, a beam at right angles to said column, means anchoring one end portion of the beam to the column, said means including a bracket comprising two connected arms arranged with their outer surfaces in right angular relationship, means securing one of said arms to the column with the other arm of the bracket extending outwardly in the direction of the beam end, said other arm of the bracket having an opening therethrough, a lug secured against a surface of the beam by the deposit of weld metal about the edges of one end of the lug and said lug extending outwardly of the beam, said lug extending through the opening in the bracket arm and having a snug fit therein, and said bracket arm having a recess in its outer surface toward the beam and about said opening and receiving the deposited weld metal about the edges of the lug whereby the surface of the beam about the lug lies flat against the outer surface of the bracket arm.

3. In combination, a column including a flange, an angle bracket having an arm extending horizontally from said flange with its outer surface uppermost and providing a seat and having the outer surface of its other arm disposed against said column, means securing the said other arm to the column, said horizontal arm of the bracket having a rectangular opening extending vertically therethrough, a beam, a cross sectionally rectangular lug welded about one end to the under side of said beam by the deposit of weld metal about the edges of said end of the lug, said lug passing through and having a snug fit in the opening in the bracket arm and having a hole therethrough at the lower side of said horizontal bracket arm, means passing through said hole in the lug and preventing movement of the lug upwardly through the opening in the bracket arm, and said bracket arm having a recess in its upper surface about said opening and receiving the weld metal about the end of the lug whereby to permit the underside of the beam to seat flat on the upper surface of the horizontal bracket arm.

4. In a bracket for securing a beam to a column, a body including a length of angle member comprising a pair of arms having their outer surfaces in right angular relationship, one of said arms adapted to be secured to the column and the other arm having a channel in its outer surface and extending from end to end of said arm and parallel with the other arm, and said channeled arm having an opening therethrough in the bottom wall of said channel to receive a securing lug welded to the beam and with projecting weld metal about the lug received in the channel.

5. In a bracket for securing a beam to a column, a body including a length of angle member comprising a pair of arms having their outer surfaces in right angular relationship, one of said arms adapted to be secured to the column and the other arm having a channel in its outer surface and extending from end to end of said arm and parallel with the other arm, said channel having inclined side walls, and said channeled arm having an elongated opening therethrough in the bottom wall of and extending in the direction of the length of said channel adapted to receive a securing lug welded to the beam and with projecting weld metal about the lug in the channel.

6. In a bracket for securing a beam to a column, a body including a length of angle member comprising a pair of arms having their outer surfaces in right angular relationship, one of said arms adapted to be secured to the column and the other arm having an opening therethrough to receive a securing lug welded to the beam, and said latter arm having sunken outer surface portions communicating with edges of said opening whereby said edges are below the outer surface of said arm to receive projecting weld metal about the lug.

7. In a bracket for securing a beam to a column, a body including a length of angle member comprising a pair of arms having their outer surfaces in right angular relationship, one of said arms adapted to be secured to the column and the other arm having an opening therethrough to receive a securing lug welded to the beam, and said latter arm having sunken outer surface portions at a pair of the opposite edges of said opening to receive projecting weld metal at the sides of the lug.

8. In a bracket for securing a beam to a column, an angle member comprising a pair of arms having their outer surfaces in right angular relationship, one of said arms adapted to be secured to the column and the other arm having an elongated opening therethrough from its outer surface to receive a securing lug welded to the beam, and said arm having sunken outer surface portions communicating with the ends of said opening to form a depression to receive projecting weld metal at the sides of the lug.

ARTHUR G. LEAKE.